2,912,992
HIGH PRESSURE RELIEF DEVICE

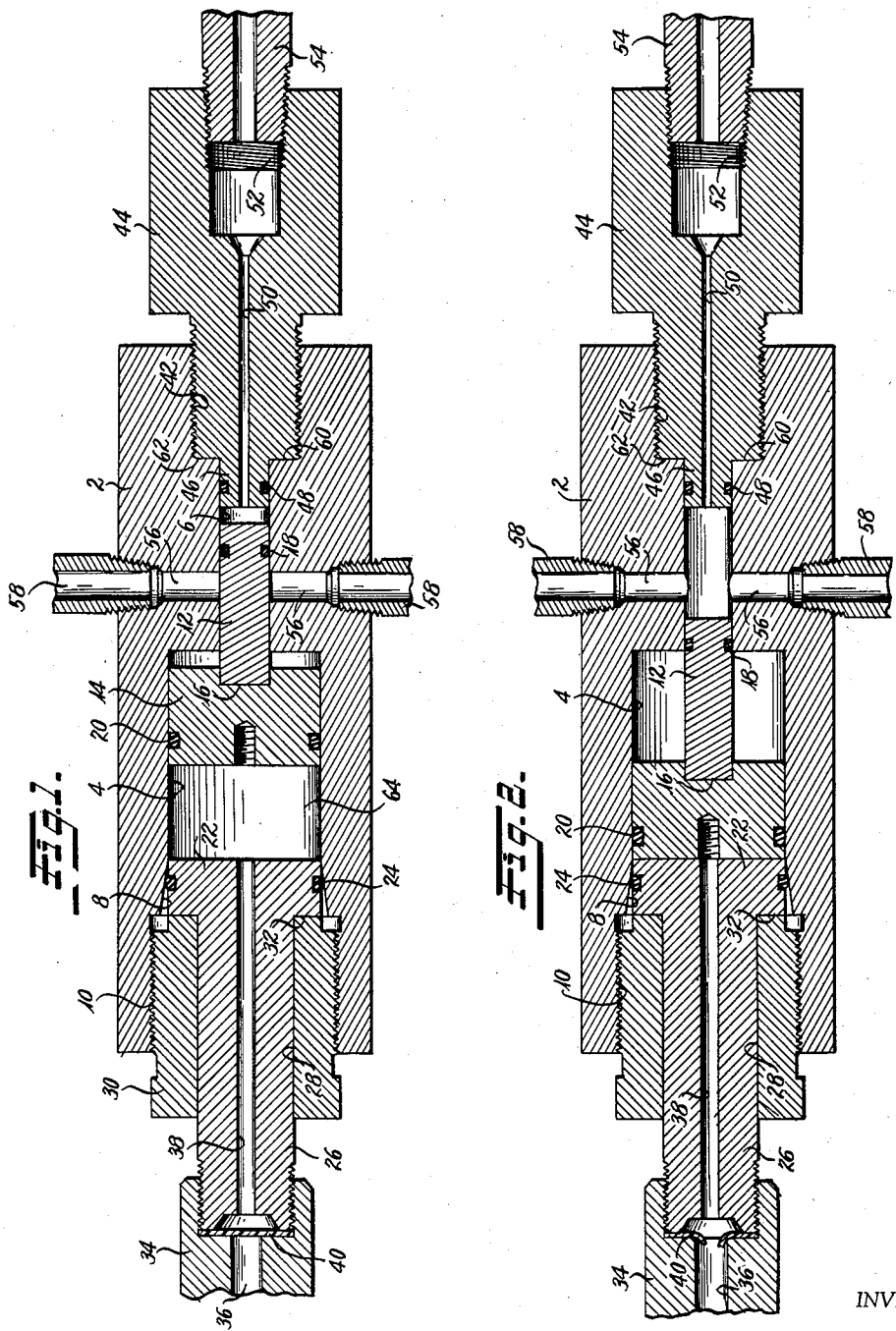

Fred Gasche and Robert L. Porter, Erie, Pa., assignors to Autoclave Engineers, Inc., Erie, Pa., a corporation of Illinois Application October 23, 1956, Serial No. 617,781

4 Claims. (Cl. 137—70)

This invention relates to fluid control devices, and particularly fluid pressure relief devices for limiting high fluid pressures by means of relatively low pressure apparatus.

Extremely high fluid pressures are coming into increasing use at the present time and may reach values of 100,000 lbs. per sq. in. Control means for such unusually high pressures, such as indicating devices and pressure relief devices, are difficult to obtain and in any event are very expensive. It is common in fluid installations to employ a frangible diaphragm exposed to the fluid pressure and designed to rupture at a predetermined maximum value of that pressure to thereby vent the system. Such diaphragms, however, are not presently available in a form to resist the extremely high pressures with which applicant is concerned. However, the present invention permits use of available diaphragms designed to rupture at lower pressures for controlling the high pressures mentioned.

The invention relates to a device, subjected to the extremely high pressure to be controlled and includes means operable to produce a proportional but lower pressure in a separate closed body of liquid and in which control functions are exercised, such as venting upon exceeding a certain predetermined pressure. In general, the invention comprises a compound piston and cylinder arrangement having a small diameter piston rigidly connected to a large diameter piston, each of which is mounted in a corresponding cylinder. The smaller cylinder communicates with the high pressure system and the larger cylinder defines a closed chamber filled with a substantially incompressible liquid, such as oil or the like. The pressure applied to the closed body of liquid by the large piston thus bears a constant ratio to the pressure in the high pressure system and that ratio is equal to the ratio of the areas of the pistons. The closed body of liquid is subjected to a control device operable to vent the large piston when the pressure therein exceeds a predetermined value. Upon such venting the piston assembly moves under the influence of the high pressure in the small cylinder to uncover a relief port communicating with the small cylinder and thus vent the high pressure system.

It is therefore an object of this invention to provide apparatus for controlling extremely high pressures by providing a proportional but lower pressure in a liquid upon which control functions are performed.

It is another object of this invention to provide apparatus of the type described of extreme simplicity of construction and ease of assembly.

Still another object of this invention is to provide an apparatus as set forth hereinabove, adapted to use conventional and inexpensive control means which, in themselves, are not suitable for the high pressures ultimately controlled.

A further object is to provide apparatus as set forth above including novel relationships between the parts whereby an assembly of separate parts may be effectively sealed against high pressure leakage in a simple and efficient manner.

Still further and additional objects and advantages will become apparent to those skilled in the art as the description proceeds in connection with the accompanying drawings, wherein:

Fig. 1 is a longitudinal sectional view through a control device incorporating the present invention and wherein the parts are shown in a first or operative position; and Fig. 2 is a view similar to Fig. 1, but showing the parts in different relative positions.

The control device shown in the drawings comprises a body member 2 having coaxial cylindrical bores 4 and 6 therein. The bore 6 is of relatively small diameter whereas the bore 4 is relatively large, as clearly shown in the drawings. The outer end of the cylinder 4 terminates in an outwardly flared conical surface 8 communicating with an internally threaded counterbore 10.

A piston assembly, comprising a small diameter piston 12 and a large diameter piston 14, is slidable in the cylinder arrangement just described. The pistons 12 and 14 are substantially rigidly connected together in any suitable manner, as at 16, and are provided with peripheral grooves seating O-rings 18 and 20, respectively.

A closure member 22 is provided with a peripheral O-ring seal 24 radially inwardly of the surface 8 and an outwardly extending central neck portion 26. The neck portion 26 extends through a central opening 28 in a clamping nut 30 which is threadedly received in the threaded counterbore 10 of the body 2. The closure member 22 is provided with a transverse outwardly facing surface 32 against which the inner end of clamping nut 30 abuts. The outermost end of the neck portion 26 is threaded to threadedly receive a female coupling member 34. The member 34 is provided with a central passageway 36 therethrough and the neck portion 26 is provided with a central passageway 38. The outer end face of the neck portion 26 constitutes a seat for a frangible diaphragm 40 and the coupling member 34 constitutes a clamp to peripherally clamp and seal the diaphragm 40 against its seat. The fitting 34 constitutes a connection by which the passageway 38 may be connected, by piping (not shown), with a remote point of disposal of relieved liquid in a manner to be described later. The diaphragm 40 may be of any suitable or conventional material, readily available on the market, and is so designed and proportioned that it constitutes a seal for the passageway 38 to resist all liquid pressure therein until that pressure exceeds a predetermined unit value. When the maximum unit pressure exists in passageway 38, the diaphragm 40 collapses or bursts to relieve that pressure and permit flow of the liquid through passageway 36 to any convenient or suitable remote position of disposal.

The body portion 2 is provided with a further internally threaded counterbore 42 at its other end, which counterbore threadedly receives a coupling member 44 having a central cylindrical boss 46 extending inwardly therefrom into the adjacent end portion of the small cylinder 6. An O-ring seal 48 around the periphery of the boss 46 seals the cylinder against loss of pressure fluid. The fitting 44 is provided with an axial passageway 50 therethrough and with suitable threads 52 to threadedly receive a conduit 54 providing communication with a high pressure fluid system.

Transverse passageways 56 in the body 2 extend into communication with the small cylinder 6 and may be provided with suitable conduits 58 extending to any desired remote location for disposal of high pressure fluid, as will be described.

It is to be noted that the structure comprising the outwardly flared conical surface 8, the closure 22 and O-ring 24 along with the transverse surface 32, and the clamping nut 30, define an arrangement of extreme simplicity of construction and yet one that can be readily and rapidly fabricated and assembled to provide a perfectly sealed closure for the cylinder. Obviously, the tapered surface 8 renders it extremely easy to insert the closure 22 and its O-ring 24 therein, whereupon the clamping nut 30 may be advanced to force the closure inwardly and thereby provide high radial compression to the O-ring 24 to form an effective seal against any pressure likely to be encountered.

In the construction of the compound piston arrangement described, the pistons may be machined to diameters slightly less than that of their corresponding cylinders and the O-rings 18 and 20 permit lateral movement of the pistons to insure proper and non-binding alignment in their respective cylinders without affecting the seal between the pistons and their cylinders.

The fitting 44 is, likewise, designed to facilitate ready assembly to the body 2 without the necessity of forming its central boss 46 to precisely and accurately fit the cylinder 6. Obviously, the boss 46 may be somewhat smaller in diameter than cylinder 6 to accommodate for misalignment between its axis and the axis of the threads 42, while O-ring 48 provides for a perfect and complete seal against the loss of high pressure. In addition, a shoulder 60 on the body 2 and a corresponding shoulder 62 on the fitting 44 may readily be accurately machined to engage each other with sealing engagement and further insure a perfect seal for the cylinder 6.

As shown, the parts are so proportioned and designed that when the piston assembly is in the right hand position of Fig. 1, the piston 12 covers the vent passages 56 and the O-ring 18 is positioned between those vent passages and the outermost end of the piston 12. In the described position the space between the piston 14 and the closure 22 constitutes a closed and sealed chamber 64. In use, the chamber 64 and passageway 38 are completely filled with a substantially incompressible liquid such as oil, water or the like. The frangible diaphragm 40 maintains the chamber 64 sealed at all pressures below the predetermined maximum value for which it is designed.

Assume, for purposes of illustration only, that the ratio of the cross-sectional areas of the cylinders 4 and 6 is 10-to-1 and that conduit 54 communicates with a high pressure fluid system operating at a pressure of 100,000 lbs. per sq. in. Under those conditions the total pressure exerted on the end of the small piston 12, when distributed over the face area of the large piston 14, imposes a unit pressure of 10,000 lbs. per sq. in. on the body of liquid in the chamber 64. Frangible diaphragms capable of resisting pressures up to 10,000 lbs. per sq. in. are commercially available and are accurately made to rupture at their rated pressure, within fairly close limits. Thus, as long as the pressure in the high pressure system does not exceed 100,000 lbs. per sq. in., no movement of the parts takes place because the liquid in chamber 64 acts like a solid block. However, if the pressure in the high pressure system were to exceed the desired limit of 100,000 lbs. per sq. in., the pressure in chamber 64 would also exceed 10,000 lbs. per sq. in., whereupon the diaphragm 40 would burst, as indicated in Fig. 2. Upon bursting of the diaphragm 40, the chamber 64 becomes vented, through passageway 36, and the pressure against the end of the small piston 12 forces the piston assembly to the left to thus expel the liquid from the chamber 64 through passageways 38 and 36 to a remote point of disposal. As the piston assembly moves to the left, the small piston 12 uncovers the vent passageways 56 and thus vents the high pressure system, through conduits 58, to conduct the high pressure fluid to any desired remote position for safe disposal.

In the apparatus herein described, applicant has provided means for controlling extremely high pressures by employing pressure-responsive devices capable of handling only relatively lower pressures and has provided such an apparatus of extremely simple design and ease of assembly and wherein the parts may be machined to practical limits of tolerance and yet provide for high precision performance.

Although a frangible diaphragm 40 has been described in connection with the device, obviously other pressure-responsive relief devices may be employed within the scope of the invention.

While a single specific embodiment of the invention has been described herein, it is to be understood that the description is by way of illustration only, that other embodiments are contemplated within the scope of the appended claims.

We claim:

1. In a high pressure relief device, a body having a bore therethrough, said bore having cylindrical portions of different diameters defining substantially coaxial communicating cylinders, a piston in each cylinder and means fixedly connecting said pistons together for axial movement as a unit, a closure for the larger of said cylinders and defining, with the piston therein, a closed chamber, a body of liquid filling said closed chamber, a pressure-responsive relief device exposed to said body of liquid, means for conducting high pressure fluid into the smaller of said cylinders on the side of the piston therein opposite the larger cylindrical portion, a high pressure relief port communicating with said smaller cylinder and normally covered by the piston therein whereby, upon actuation of said pressure-responsive relief device to vent said chamber, the pressure in said smaller cylinder moves said pistons to expel liquid from said chamber and to uncover said relief port thereby venting the high pressure in said smaller cylinder.

2. A device as defined in claim 1 wherein said pressure-responsive relief device comprises, a passageway communicating with said chamber and a frangible diaphragm closing said passageway, said diaphragm engaging the liquid in said chamber and being frangible at a unit pressure substantially less than the unit pressure in said smaller cylinder.

3. In a high pressure relief device, means defining a relatively small diameter cylinder with a piston therein and means for admitting high pressure fluid to said cylinder on one side of said piston, means defining a relatively large diameter cylinder with a piston therein, said large diameter cylinder defining a closed chamber on one side of its piston, a vent opening from said chamber, a frangible seal closing said vent opening, a body of liquid filling said chamber, means for transmitting the entire force exerted on said small piston, by said high pressure fluid, to the other side of said large piston, and means operable in response to movement of said small piston, upon rupture of said frangible seal, for venting said high pressure fluid from said small diameter cylinder.

4. A device as defined in claim 3 including, a body having an internally threaded recess extending inwardly from an outer surface thereof, a bore of less diameter than said recess, but substantially coaxial therewith, extending inwardly of said body from the bottom of said recess and defining said relatively small diameter cylinder, an externally threaded fitting threaded into said recess and having a shoulder sealingly abutting the bottom thereof around said bore, a central projection on said fitting extending into said bore, an O-ring seal between the periphery of said projection and said bore, said means for admitting high pressure fluid comprising a passageway through said fitting and projection whereby to conduct said pressure fluid into said cylinder.

References Cited in the file of this patent

UNITED STATES PATENTS

| | | |
|---|---|---|
| 1,081,833 | Hyndman | Dec. 16, 1913 |
| 1,889,256 | Lipscomb | Nov. 29, 1932 |
| 2,322,877 | Parker | June 29, 1943 |
| 2,411,057 | Robbins | Nov. 12, 1946 |
| 2,707,479 | Thomann et al. | May 3, 1955 |
| 2,710,014 | Hayes | June 7, 1955 |
| 2,748,947 | Jay | June 5, 1956 |